(12) United States Patent
Omoto et al.

(10) Patent No.: US 9,927,031 B2
(45) Date of Patent: Mar. 27, 2018

(54) SEALING STRUCTURE

(71) Applicant: NOK CORPORATION, Tokyo (JP)

(72) Inventors: Shinya Omoto, Tottori (JP); Toru Nakashima, Tottori (JP); Hiroki Matsui, Fukushima (JP); Yusuke Kamiya, Fukushima (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 15/526,112

(22) PCT Filed: Nov. 6, 2015

(86) PCT No.: PCT/JP2015/081261
§ 371 (c)(1),
(2) Date: May 11, 2017

(87) PCT Pub. No.: WO2016/080203
PCT Pub. Date: May 26, 2016

(65) Prior Publication Data
US 2017/0307086 A1    Oct. 26, 2017

(30) Foreign Application Priority Data
Nov. 18, 2014  (JP) .................... 2014-233304

(51) Int. Cl.
*F16J 15/34* (2006.01)
*F16J 15/3204* (2016.01)
(Continued)

(52) U.S. Cl.
CPC ......... *F16J 15/3204* (2013.01); *F16F 15/126* (2013.01); *F16J 15/447* (2013.01)

(58) Field of Classification Search
CPC ....... F16J 15/3204; F16J 15/126; F16J 15/447
See application file for complete search history.

(56) References Cited

U.S. PATENT DOCUMENTS

| | | | |
|---|---|---|---|
| 5,004,248 A | * | 4/1991 | Messenger ........... F16J 15/3256 277/351 |
| 5,649,710 A | * | 7/1997 | Kanda ................. F16J 15/3256 277/371 |

(Continued)

FOREIGN PATENT DOCUMENTS

| | | |
|---|---|---|
| JP | S59-127962 U | 8/1984 |
| JP | S60-107423 U | 7/1985 |

(Continued)

*Primary Examiner* — Gilbert Y Lee
(74) *Attorney, Agent, or Firm* — Harness, Dickey & Pierce, P.L.C.

(57) ABSTRACT

A sealing structure that allows for formation of a side lip, as well as a labyrinth structure between an oil seal and a torsional vibration damper, even when a reinforcing ring has a short inward flange part. The sealing body 120 includes a side lip 124 extending from near a distal end of an inward flange part 112 of the reinforcing ring 110 radially inward and further toward an air side (A) than a dust lip 122 to a position not as far as the outer circumferential surface of a tubular part 210. The tubular part 210 includes a small-diameter part 211 on which the dust lip 122 slides, and a large-diameter part 212 on the air side (A). The large-diameter part 212 has a tapered surface 212a formed on an outer circumferential surface thereof that reduces in diameter toward the air side (A). An annular gap S is formed between this tapered surface 212a and an inner circumferential surface of the side lip 124.

2 Claims, 3 Drawing Sheets

(51) Int. Cl.
  *F16F 15/126* (2006.01)
  *F16J 15/447* (2006.01)

(56) References Cited

U.S. PATENT DOCUMENTS 6,145,842 A * 11/2000 Zellers .................... F16H 41/30
                                                          277/394
6,196,551 B1 * 3/2001 Zellers ................. F16J 15/3204
                                                          277/402

FOREIGN PATENT DOCUMENTS

| JP | 2011-241891 A | 12/2011 |
| JP | 3193243 U | 9/2014 |
| WO | 2012-039156 A1 | 3/2012 |

* cited by examiner

SEALING STRUCTURE

CROSS-REFERENCE TO RELATED APPLICATIONS

This application is a National Stage of International Application No. PCT/JP2015/081261, filed Nov. 6, 2015 (now WO 2016/080203 A1), which claims priority of Japanese Application No. 2014-233304, filed Nov. 18, 2014. The entire disclosures of each of the above applications are incorporated herein by reference.

FIELD

The present disclosure relates to a sealing structure that has a torsional vibration damper.

BACKGROUND

A technique has hitherto been known which minimizes the entrance of foreign substances from outside into a sealing structure that has a torsional vibration damper and an oil seal, by providing a labyrinth structure in the sealing structure. One example of such a structure will be described with reference to FIG. 3. FIG. 3 is a schematic cross-sectional view of a sealing structure according to a prior art example.

As shown, the torsional vibration damper 600 includes a tubular part 610 that is attached to a crankshaft 300. The oil seal 500 includes a reinforcing ring 510 and a sealing body 520 made of an elastic material and formed integrally with the reinforcing ring 510. The reinforcing ring 510 includes a cylindrical part 511, and an inward flange part 512 provided at an end on the opposite side from the sealed-fluid side of this cylindrical part 511. The sealing body 520 includes an oil lip 521 provided such as to be slidable on an outer circumferential surface of the tubular part 610, and a dust lip 522 provided further on the opposite side from the sealed-fluid side than the oil lip 521 and slidable on the outer circumferential surface of the tubular part 610.

In addition, a side lip 523 is provided to the sealing body 520 in this prior art example. This side lip 523 is configured to increase in diameter toward the opposite side from the sealed-fluid side so that foreign substances do not easily enter the sliding part between the dust lip 522 and the outer circumferential surface of the tubular part 610 from the air side. An annular groove 621 is formed in a body part 620 of the torsional vibration damper 600. The side lip 523 is disposed such as to extend into this annular groove 621. This way, a confined and complex path is formed from the air side to the sliding part between the dust lip 522 and the outer circumferential surface of the tubular part 610. A labyrinth structure is thus provided.

In some cases where there is only a small space available for mounting the oil seal 500, the inward flange part 512 of the reinforcing ring 510 has to be made shorter. In such cases, it may not be possible to adopt the side lip 523 configured as described above. The reason therefor is explained below.

The oil seal 500 is fabricated by insert-molding the sealing body 520, with the reinforcing ring 510 serving as the insert component. In this process, the sealing body 520 is formed, with the reinforcing ring 510 being set in position in the metal mold. The resultant sealing body 520 has an opening 524, which leads to an end face of the inward flange part 512 of the reinforcing ring 510 on the opposite side from the sealed-fluid side. That is, the opening 524 is formed in a portion corresponding to a support part (not shown) provided in the metal mold for the positioning purpose. Therefore, the portion on the end face of the inward flange part 512 of the reinforcing ring 510 on the opposite side from the sealed-fluid side is exposed. This exposed portion is utilized when mounting the oil seal 500. Namely, when mounting the oil seal 500, it is pressed with a jig or the like. If the sealing body 520 that is made of an elastic material is pressed, it may be damaged or broken, so that the reinforcing ring 510 is pressed instead, through the opening 524.

If the inward flange part 512 of the reinforcing ring 510 is short and the side lip 523 is configured to increase in diameter toward the opposite side from the sealed-fluid side, the opening 524 may be blocked by the side lip 523. If this is the case, the reinforcing ring 510 cannot be pressed with a jig or the like through the opening 524.

During transportation, a plurality of oil seals 500 are stacked on one another along the center axis direction. In the case with the oil seal 500 shown in FIG. 3, when a plurality of the oil seals 500 are stacked on one another, the side lips 523 fit in the annular gaps between the oil lips 521 and the cylindrical parts 511 of the reinforcing rings 510 of adjacent oil seals 500. Thus the plurality of oil seals 500 can be snugly stacked on one another. However, if the inward flange part 512 of the reinforcing ring 510 is short and the side lip 523 is configured to increase in diameter toward the opposite side from the sealed-fluid side, the side lip 523 may, depending on size, abut a portion of the reinforcing ring 510 of the adjacent oil seal 500, near the distal end of the cylindrical part 511 of the reinforcing ring 510. In this case, the plurality of oil seals 500 cannot be stacked on one another.

Further, the body part 620 of the torsional vibration damper 600 needs to be sufficiently thick so as to form the annular groove 621 for providing the labyrinth structure. This increases the weight of the body part 620 of the torsional vibration damper 600. Also, since the body part 620 is typically a cast product so that the annular groove 621 has to be formed by a cutting process, which is another impediment to cost reduction.

CITATION LIST

Patent Literature

[PTL 1] Japanese Patent Application Laid-open No. 2011-241891

SUMMARY

Technical Problem

An object of the present disclosure is to provide a sealing structure that allows for formation of a side lip, as well as a labyrinth structure between an oil seal and a torsional vibration damper, even when the reinforcing ring has a short inward flange part.

Solution to Problem

The present disclosure adopted the following means to solve the problem noted above.

Namely, the sealing structure of the present disclosure is a sealing structure including a torsional vibration damper having a tubular part to be attached to a crankshaft, and an oil seal that seals an annular gap between an inner circumferential surface of a shaft hole in a housing for the crankshaft to pass through and an outer circumferential surface of the tubular part.

The oil seal includes a reinforcing ring having a cylindrical part, and an inward flange part provided at an end on an opposite side from a sealed-fluid side of the cylindrical part, and a sealing body made of an elastic material and provided integrally with the reinforcing ring.

The reinforcing ring is configured such that a portion on an end face of the inward flange part on the opposite side from the sealed-fluid side is exposed.

The sealing body includes an oil lip extending from near a distal end of the inward flange part toward the sealed-fluid side and slidable on the outer circumferential surface of the tubular part, a dust lip extending from near the distal end of the inward flange part toward the opposite side from the sealed-fluid side and slidable on the outer circumferential surface of the tubular part, and a side lip extending from near the distal end of the inward flange part radially inward and further toward the opposite side from the sealed-fluid side than the dust lip to a position not as far as the outer circumferential surface of the tubular part.

The tubular part includes a small-diameter part on which the dust lip slides, and a large-diameter part on an opposite side from the sealed-fluid side of the small-diameter part.

An outer circumferential surface of the large-diameter part includes a tapered surface that reduces in diameter toward the opposite side from the sealed-fluid side. An annular gap is formed between the tapered surface and an inner circumferential surface of the side lip.

According to the present disclosure, the side lip extends from near the distal end of the inward flange part of the reinforcing ring radially inward and further toward the opposite side from the sealed-fluid side than the dust lip to a position not as far as the outer circumferential surface of the tubular part of the torsional vibration damper. Therefore, even if the inward flange part of the reinforcing ring is short, the exposed portion on the end face on the opposite side from the sealed-fluid side of the inward flange part will not be blocked by the side lip. Accordingly, when mounting the oil seal, the inward flange part can be pressed directly by a jig or the like. Even when a plurality of oil seals are stacked on one another along the center axis direction, their side lips will not abut a portion of the reinforcing ring of adjacent oil seals, near the distal end of the cylindrical part of the reinforcing ring.

An annular gap is formed between the tapered surface formed on the outer circumferential surface of the large-diameter part provided to the tubular part of the torsional vibration damper and the inner circumferential surface of the side lip. This way, a confined and complex path is formed from the opposite side from the sealed-fluid side to a sliding part between the dust lip and the outer circumferential surface of the small-diameter part of the tubular part. Namely, a labyrinth structure can be provided. As described above, according to the present disclosure, even when the reinforcing ring has a short inward flange part, a side lip can be formed, and also a labyrinth structure can be provided between the oil seal and the torsional vibration damper.

The outer circumferential surface of the large-diameter part provided to the tubular part of the torsional vibration damper is formed of a tapered surface that reduces in diameter toward the opposite side from the sealed-fluid side. This way, entrance of dirt or the like into the annular gap between the outer circumferential surface of the large-diameter part of the tubular part and the side lip can be minimized.

The inner circumferential surface of the side lip should preferably be formed of a tapered surface with a taper angle substantially equal to a taper angle of the tapered surface formed on the large-diameter part.

This allows the distance from one end to the other end of the annular gap to be made long, with a small spacing between the outer circumferential surface of the large-diameter part of the tubular part and the side lip. This way, entrance of dirt or the like into the sliding part between the dust lip and the outer circumferential surface of the small-diameter part of the tubular part can be minimized more reliably.

Advantageous Effects of the Disclosure

As described above, according to the present disclosure, even when the reinforcing ring has a short inward flange part, a side lip can be formed, and also a labyrinth structure can be provided between the oil seal and the torsional vibration damper.

DRAWINGS

DETAILED DESCRIPTION

Modes for carrying out this disclosure will be hereinafter illustratively described in detail based on a specific embodiment with reference to the drawings. It should be noted that, unless otherwise particularly specified, the sizes, materials, shapes, and relative arrangement or the like of constituent components described in the embodiment are not intended to limit the scope of this disclosure.

Embodiment

Figure 1:
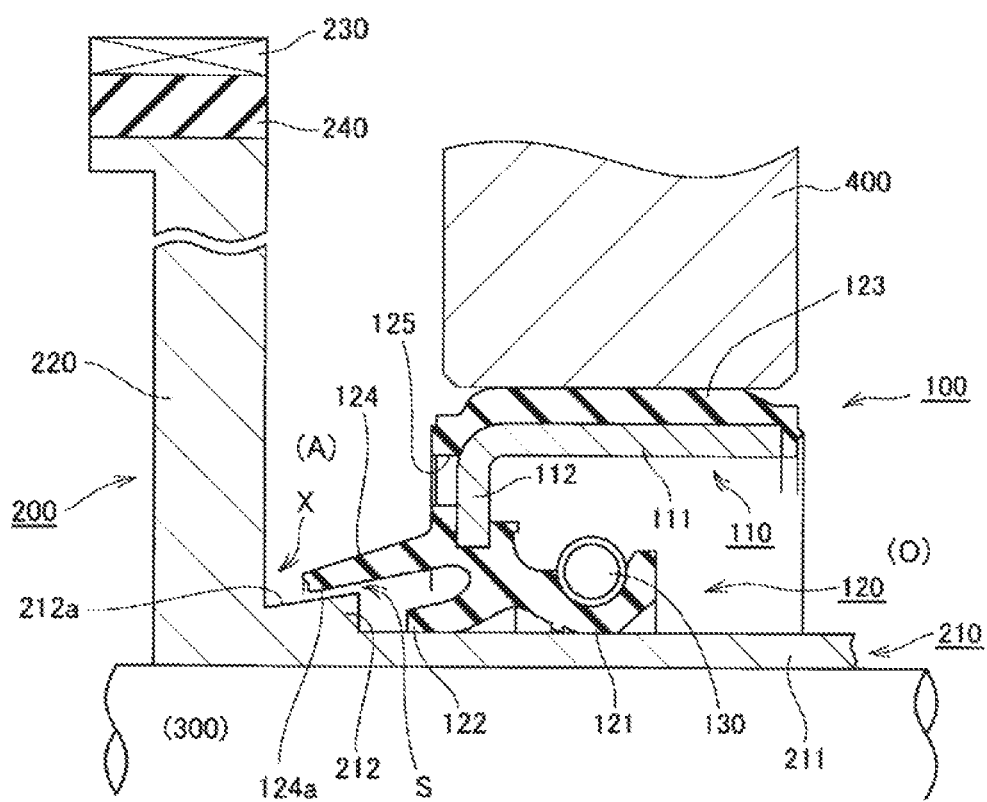
FIG. 1 is a schematic cross-sectional view of a sealing structure according to an embodiment of the present disclosure.
Figure 2:
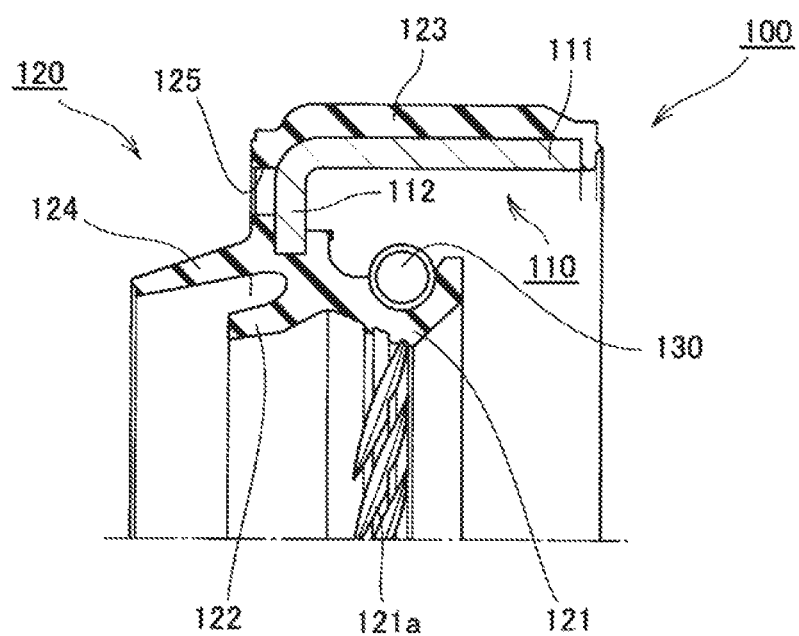
FIG. 2 is a schematic cross-sectional view of an oil seal according to the embodiment of the present disclosure.
Figure 3:
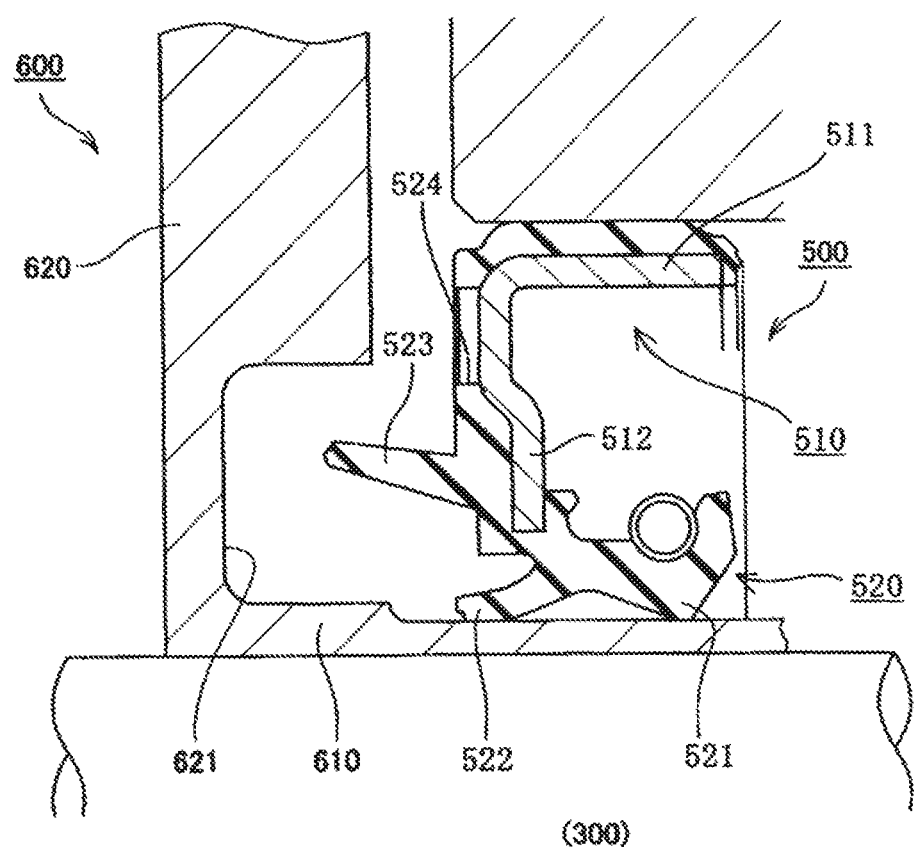
FIG. 3 is a schematic cross-sectional view of a sealing structure according to a prior art example.

The sealing structure according to an embodiment of the present disclosure will be described with reference to FIG. 1 and FIG. 2. FIG. 1 is a schematic cross-sectional view of the sealing structure according to the embodiment of the present disclosure. It is a cross-sectional view of a plane that contains the center axis of a crankshaft. FIG. 1 shows a simplified form of a torsional vibration damper. FIG. 2 is a schematic cross-sectional view of an oil seal according to the embodiment of the present disclosure. It is a cross-sectional view of a plane that contains the center axis of the oil seal, which has a substantially rotationally symmetrical shape.

<Sealing Structure>

The overall configuration of the sealing structure according to this embodiment will be described with reference to FIG. 1 in particular. The sealing structure according to this embodiment includes an oil seal 100, a torsional vibration damper 200 attached to a crankshaft 300, and a front cover 400 as a housing.

The torsional vibration damper 200 is an energy absorbing device attached to the crankshaft 300 for preventing the torsional vibration amplitude from becoming too large. The torsional vibration damper 200 has an annular body part 220 and a cylindrical tubular part 210 on the inner peripheral side of the body part 220 to be attached to the crankshaft 300. An annular weight 230 made of metal, and an annular elastic member 240 made of an elastic material such as rubber for coupling the body part 220 and the annular weight 230 are provided on the outer peripheral side of the body part 220. These annular weight 230 and annular elastic member 240 provide the function of restricting the torsional vibration amplitude of the crankshaft 300.

The oil seal 100 serves the function of sealing an annular gap between the inner circumferential surface of a shaft hole in the front cover 400 for the crankshaft 300 to pass through and the outer circumferential surface of the tubular part 210 of the torsional vibration damper 200. More specifically, the oil seal 100 serves the function of minimizing leakage of oil, which is a fluid to be sealed, from a sealed-fluid side (O) to an air side (A) that is the opposite side from the sealed-fluid side (O), and of minimizing entrance of foreign substances such as dust or dirt from the air side (A) to the sealed-fluid side (O).

<Oil Seal>

The oil seal 100 will be described in more detail with reference to FIG. 1 and FIG. 2. The oil seal 100 includes a metal reinforcing ring 110 and a sealing body 120 made of an elastic material such as rubber and formed integrally with the reinforcing ring 110. The oil seal 100 can be obtained by forming the sealing body 120 by insert molding, with the reinforcing ring 110 as the insert component.

The reinforcing ring 110 includes a cylindrical part 111 and an inward flange part 112 provided at an end on the air side (A) of the cylindrical part 111. The sealing body 120 integrally includes an oil lip 121 and a dust lip 122 that are slidable on the outer circumferential surface of the tubular part 210 of the torsional vibration damper 200, an outer circumferential sealing portion 123 that makes tight contact with an inner circumferential surface of the shaft hole in the front cover 400, and a side lip 124.

The oil lip 121 is formed to extend from near the tip of the inward flange part 112 of the reinforcing ring 110 radially inward toward the sealed-fluid side (O). A plurality of thread grooves 121a are formed in the inner circumferential surface of the oil lip 121, which provide the pumping effect for returning leaked oil back to the sealed-fluid side (O). In addition, a garter spring 130 is mounted on the outer circumferential side of this oil lip 121 for applying a force radially inward so that the oil lip 121 will not separate from the outer circumferential surface of the tubular part 210. The dust lip 122 is formed to extend from near the tip of the inward flange part 112 radially inward toward the air side (A).

The side lip 124 according to this embodiment is formed to extend from near the tip of the inward flange part 112 radially inward and further toward the air side (A) than the dust lip 122 to a position not as far as the outer circumferential surface of the tubular part 210.

The sealing body 120 is formed with openings 125. The plurality of openings 125 are circumferentially spaced from each other. As described in conjunction with the background art, the plurality of openings 125 are formed in portions corresponding to support portions (not shown) provided in the metal mold for the positioning purpose during insert molding. These openings 125 expose parts of the end face on the air side (A) of the inward flange part 112 of the reinforcing ring 110.

<Labyrinth Structure>

The labyrinth structure provided in the sealing structure according to this embodiment will be described with reference to FIG. 1 in particular. In this embodiment, the tubular part 210 of the torsional vibration damper 200 is made up of a small-diameter part 211 on the sealed-fluid side (O) and a large-diameter part 212 nearer to the air side (A) than this small-diameter part 211. The oil lip 121 and dust lip 122 of the oil seal 100 slide on the small-diameter part 211 of the tubular part 210. The outer circumferential surface of the large-diameter part 212 of the tubular part 210 is formed as a tapered surface 212a that reduces in diameter toward the air side (A). An annular gap S is formed between this tapered surface 212a and the inner circumferential surface of the side lip 124.

With the annular gap S thus provided, a confined and complex path is formed from the air side (A) to a sliding part between the dust lip 122 and the outer circumferential surface of the small-diameter part 211 of the tubular part 210. A labyrinth structure is thus provided.

The inner circumferential surface of the side lip 124 is also formed as a tapered surface 124a. It goes without saying that the annular gap S mentioned above is formed even when the taper angle of the tapered surface 124a of this side lip 124 is different from the taper angle of the tapered surface 212a of the large-diameter part 212 of the tubular part 210. However, if these taper angles differ from each other, the spacing of the annular gap S will be increasing gradually either from the sealed-fluid side (O) to the air side (A), or from the air side (A) to the sealed-fluid side (O). It will therefore be harder to make the distance from one end to the other of the annular gap S long while keeping a small spacing.

In this embodiment, therefore, the inner circumferential surface of the side lip 124 is formed as a tapered surface 124a with substantially the same taper angle as that of the tapered surface 212a of the large-diameter part 212 of the tubular part 210. As both members are designed to be tapered at an equal angle, their taper angles are substantially equal. This way, the distance from one end to the other of the annular gap S can be made long while keeping a small spacing.

With such a labyrinth structure provided, entrance of foreign substances such as dust or dirt into the sliding part between the dust lip 122 and the outer circumferential surface of the tubular part 210 can be minimized without involving an increase in torque. Thus the sealing function provided by the oil seal 100 can be consistently exhibited for a long time.

<Advantages of the Sealing Structure According to this Embodiment>

According to the sealing structure of this embodiment, the side lip 124 is configured to extend from near the distal end of the inward flange part 112 of the reinforcing ring 110 radially inward and further toward the air side (A) than the dust lip 122 to a position not as far as the outer circumferential surface of the tubular part 210 of the torsional vibration damper 200. Therefore, even if the inward flange part 112 of the reinforcing ring 110 is short, the openings 125 formed in the sealing body 120 will not be blocked by the side lip 124. That is, the exposed portions on the end face on the air side (A) of this inward flange part 112 will not be blocked by the side lip 124. Accordingly, when mounting the oil seal 100, the inward flange part 112 can be pressed directly by a jig or the like. Namely, the oil seal 100 is mounted into the shaft hole in the front cover 400 by being pressed with a jig or the like from the left side of FIG. 1. In this embodiment, the metal inward flange part 112 is pressed directly by a jig or the like through the openings 125, so that the sealing body 120 made of an elastic material will not be damaged or broken.

Even when a plurality of oil seals 100 are stacked on one another along the center axis direction, their side lips 124 will not abut a portion of the reinforcing ring 110 of adjacent oil seals 100, near the distal end of the cylindrical part 111 of the reinforcing ring 110. Therefore, the oil seals 100 according to this embodiment can be stacked on one another along the center axis direction.

Furthermore, in the sealing structure according to this embodiment, an annular gap S is formed between an outer circumferential surface (tapered surface 212a) of the large-diameter part 212 of the tubular part 210 and the inner circumferential surface of the side lip 124. This annular gap S provides a labyrinth structure. Therefore, with the sealing structure according to this embodiment, even when the inward flange part 112 of the reinforcing ring 110 is short, a side lip 124 can be provided, and a labyrinth structure can also be provided between the oil seal 100 and the torsional vibration damper 200. A labyrinth structure can thus be provided even without providing an annular groove in the torsional vibration damper, which generally involves cumbersome processing. Since it is not necessary to provide an annular groove in the body part 220 of the torsional vibration damper 200, the thickness of the body part 220 can be reduced. This enables a reduction in weight of the body part 220. In the case with this embodiment, it is only necessary to provide a step on the tubular part 210 (i.e., to form the tubular part 210 from a small-diameter part 211 and a large-diameter part 212). Even when the tubular part is fabricated by casting, no cutting process is necessary, so that the production cost can be reduced.

The outer circumferential surface of the large-diameter part 212 provided to the tubular part 210 of the torsional vibration damper 200 is formed as a tapered surface 212a that reduces in diameter toward the air side (A). This way, entrance of dirt or the like into the annular gap S between the outer circumferential surface of the large-diameter part 212 of the tubular part 210 and the side lip 124 can be minimized. Dirt or the like that came down accumulates near the portion indicated with arrow X in FIG. 1 (boundary between the body part 220 and the large-diameter part 212), and as the crankshaft 300 rotates, the dirt drops further down in FIG. 1. Thus entrance of dirt or the like into the annular gap S can be minimized.

Moreover, in this embodiment, the inner circumferential surface of the side lip 124 is formed as a tapered surface 124a with substantially the same taper angle as that of the tapered surface 212a of the large-diameter part 212 of the tubular part 210. This allows the distance from one end to the other end of the annular gap S to be made long, with a small spacing between the outer circumferential surface of the large-diameter part 212 of the tubular part 210 and the side lip 124. This way, entrance of dirt or the like into a sliding part between the dust lip 122 and the outer circumferential surface of the small-diameter part 211 of the tubular part 210 can be minimized more reliably.

REFERENCE SIGNS LIST

100 Oil seal
110 Reinforcing ring
111 Cylindrical part
112 Inward flange part
120 Sealing body
121 Oil lip
121a Thread groove
122 Dust lip
123 Outer circumferential sealing portion
124 Side lip
124a Tapered surface
125 Opening
130 Garter spring
200 Torsional vibration damper
210 Tubular part
211 Small-diameter part
212 Large-diameter part
212a Tapered surface
220 Body part
230 Annular weight
240 Annular elastic member
300 Crankshaft
400 Front cover
S Annular gap

The invention claimed is:

1. A sealing structure comprising:
a torsional vibration damper having a tubular part to be attached to a crankshaft; and
an oil seal that seals an annular gap between an inner circumferential surface of a shaft hole in a housing for the crankshaft to pass through and an outer circumferential surface of the tubular part,
the oil seal including:
a reinforcing ring having a cylindrical part, and an inward flange part provided at an end on an opposite side from a sealed-fluid side of the cylindrical part; and
a sealing body made of an elastic material and provided integrally with the reinforcing ring,
the reinforcing ring being configured such that a portion on an end face of the inward flange part on the opposite side from the sealed-fluid side is exposed,
the sealing body including:
an oil lip extending from near a distal end of the inward flange part toward the sealed-fluid side and slidable on the outer circumferential surface of the tubular part;
a dust lip extending from near the distal end of the inward flange part toward the opposite side from the sealed-fluid side and slidable on the outer circumferential surface of the tubular part; and
a side lip extending from near the distal end of the inward flange part radially inward and further toward the opposite side from the sealed-fluid side than the dust lip to a position not as far as the outer circumferential surface of the tubular part,
and
the tubular part including a small-diameter part on which the dust lip slides, and a large-diameter part on an opposite side from the sealed-fluid side of the small-diameter part,
an outer circumferential surface of the large-diameter part including a tapered surface that reduces in diameter toward the opposite side from the sealed-fluid side, an annular gap being formed between the tapered surface and an inner circumferential surface of the side lip.

2. A sealing structure comprising:
a torsional vibration damper having a tubular part to be attached to a crankshaft; and
an oil seal that seals an annular gap between an inner circumferential surface of a shaft hole in a housing for the crankshaft to pass through and an outer circumferential surface of the tubular part,
the oil seal including:
a reinforcing ring having a cylindrical part, and an inward flange part provided at an end on an opposite side from a sealed-fluid side of the cylindrical part; and a sealing body made of an elastic material and provided integrally with the reinforcing ring,
the reinforcing ring being configured such that a portion on an end face of the inward flange part on the opposite side from the sealed-fluid side is exposed,
the sealing body including:
an oil lip extending from near a distal end of the inward flange part toward the sealed-fluid side and slidable on the outer circumferential surface of the tubular part;
a dust lip extending from near the distal end of the inward flange part toward the opposite side from the sealed-fluid side and slidable on the outer circumferential surface of the tubular part; and
a side lip extending from near the distal end of the inward flange part radially inward and further toward the opposite side from the sealed-fluid side than the dust lip to a position not as far as the outer circumferential surface of the tubular part, and
the tubular part including a small-diameter part on which the dust lip slides, and a large-diameter part on an opposite side from the sealed-fluid side of the small-diameter part,
an outer circumferential surface of the large-diameter part including a tapered surface that reduces in diameter toward the opposite side from the sealed-fluid side, an annular gap being formed between the tapered surface and an inner circumferential surface of the side lip;
wherein the inner circumferential surface of the side lip is formed of a tapered surface with a taper angle substantially equal to a taper angle of the tapered surface formed on the large-diameter part.

* * * * *